US006993552B2

(12) United States Patent
Jacobs et al.

(10) Patent No.: US 6,993,552 B2
(45) Date of Patent: Jan. 31, 2006

(54) MANAGING ASYNCHRONOUS OBJECTS RECEIVED OVER MULTIPLE COMMUNICATION PROTOCOLS

(75) Inventors: Andrew W. Jacobs, Seattle, WA (US); Dominique Fortier, Snoqualmie, WA (US); Joseph K. Ollis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 09/964,318

(22) Filed: Sep. 26, 2001

(65) Prior Publication Data

US 2003/0061397 A1 Mar. 27, 2003

(51) Int. Cl.
  *H04M 1/57* (2006.01)
  *G06F 15/177* (2006.01)
(52) U.S. Cl. .................. 709/200; 709/217; 707/10; 340/825.22
(58) Field of Classification Search ................ 709/217, 709/218, 219, 246, 250, 221; 707/10, 102; 340/825.22
See application file for complete search history.

(56) References Cited

U.S. PATENT DOCUMENTS

| 5,418,524 | A | 5/1995 | Fennell ................. 340/825.22 |
| 6,477,565 | B1 * | 11/2002 | Daswani et al. ........... 709/217 |
| 6,609,148 | B1 * | 8/2003 | Salo et al. ............... 709/217 |
| 6,728,714 | B1 * | 4/2004 | Doganata et al. ........... 707/10 |

FOREIGN PATENT DOCUMENTS

EP          0936792 A1   8/1999

OTHER PUBLICATIONS

"Specification of the Bluetooth System—Wireless Connections Made Easy." Bluetooth Version 1.1, Feb. 22, 2001.
Shreedhar, M., et al. "Efficient Fair Queuing Using Deficit Round-Robin." IEEE/ACM Transactions on Networking, vol. 4, No. 3, Jun. 1996.
Digital Cellular Telecommunications System (Phase 2+) (GSM); Universal Mobile Telecommunications Systems (UMTS); Mobile Execution Environment (MExE); Functional Description; Stage 2, GSM Global Systems for Mobile Communication; V4.2.0 (Jun. 2001).
Cravotta, N., *Device Connectivity: A Whole New Set of Secret Handshakes*, EDN (US Edition), vol. 45, No. 1, pp. 113-116.
Fossati, F., *Communication Standards—a Tower of Babel?*, Elettronica Oggi, No. 286, pp. 54, 56, 58-59.
Tay, E., *Comparing Infrared and Bluetooth Short-Range Solutions*, Microwaves & RF, vol. 40, No. 1, pp. 121-122.

* cited by examiner

*Primary Examiner*—Kamini Shah
(74) *Attorney, Agent, or Firm*—Workman Nydegger

(57) ABSTRACT

Systems and methods for managing asynchronous object transfers over multiple wireless networks. At a device, each received object is detected and parsed to extract identifying information such as sender and object type. Each object is stored in a temporary storage without being processed by any application of the device. The user is prompted to either accept or reject each object, one at a time or all together. Each accepted object is persistently stored on the device and processed by an application that is associated with the type of object. Rejected objects are deleted from the temporary storage and are not persistently stored on the device.

38 Claims, 4 Drawing Sheets

MANAGING ASYNCHRONOUS OBJECTS RECEIVED OVER MULTIPLE COMMUNICATION PROTOCOLS

BACKGROUND OF THE INVENTION

1. The Field of the Invention

The present invention relates to systems and methods for managing asynchronous object transfers over multiple networks that have different communication protocols. More particularly, the present invention relates to systems and methods for managing incoming object transfers by temporarily storing each incoming object in temporary storage for presentation to a user who accepts or rejects the received objects.

2. Background and Relevant Art

Devices such as personal digital assistants (PDAs), cellular telephones, and laptop computers are becoming increasingly popular and have capabilities that make them indispensable tools rather than conveniences. PDAs, for example, allow a user to store a wide range of data including address data, calendar data, and contact data in a device that is easy to carry and convenient to use. With a PDA, a user can receive emails, write memos, create to do lists, and the like with relative ease.

Another advantage of devices like PDAs is that a user can share data stored on their PDA with the PDA of another user. This is typically accomplished using an infrared (IR) port that is usually provided with each device. To share data over an IR port, the user that is sharing an object will select or identify the object to be shared and the user receiving the selected object will enable their device to receive an incoming object transfer. Then, the users place their devices in a manner that permits their respective IR ports to "see" each other. The user sending the object then sends the selected object to the other user over the IR connection. When the object transfer is complete, the connection is automatically terminated and the object has been successfully transferred to the other user's device where it is processed and stored.

These types of connections present relatively little security risk to either user because an IR connection requires that the two devices be able to "see" each other. Because of this limitation on IR object transfer, the users will also be able to see and identify each other. For at least these reasons, it is very difficult for a malicious user to transfer an object to a particular user's device without the user knowing that an object has been transferred to their device.

The advent of technologies that do not require a line of sight, however, introduces security risks that were not previously present. Bluetooth, for example, can transfer files over longer distances and through barriers such as walls using radio links. Bluetooth also permits a device to process more than one incoming object transfer at a time. If a user has configured their device to receive incoming object transfers (often referred to as beams), it is possible that an unwanted object could be received on the user's device, thus placing the user's data at risk. A malicious user, for example, could transfer a virus onto the user's device that could cause the user's data to be broadcast back to the malicious user or otherwise affect the user's data and/or the user's device. What is needed are systems and methods that permit a user to manage incoming object transfers or beams and that provide additional security to the user for the data on their device.

SUMMARY OF THE INVENTION

These and other problems are overcome by the present invention which is directed to systems and methods for managing all asynchronous incoming object transfers or beams to a device. The present invention provides the ability to receive and process all asynchronous object transfers that are received over various wireless and/or wired communication networks or protocols, such as infrared transmission and bluetooth.

All asynchronously received objects are placed in temporary storage and are presented to the user, who decides how to process or otherwise handle the received objects by either accepting or rejecting each object. One advantage is that the objects received by the device are not processed by corresponding applications before they are accepted or rejected by the user. For example, a contact application does not receive or process a contact object until the contact object has been accepted by the user.

When an incoming object transfer is received or when an object is received by a device, the object is usually parsed. Parsing the object provides the device with the ability to provide the user with some information about the object, such as what type of object has been received, who sent the object, and the like, although this information is not always available from the received object or may be included in the object transfer.

The object is placed in temporary storage, such as a queue, and the user is notified about the received object. As other objects are received, they are also parsed and stored in the same queue. Notifications to the user will usually indicate how many objects have been received or are in the queue awaiting action from the user. The notifications or prompts will provide the user with various options (accept, reject, accept all, reject all, for example) that have certain consequences. Accepting an object will result in the object being processed by the device and accepting all of the objects results in all objects being processed by the device without further user input. Rejecting an object results in the object being deleted from the queue and the object is never processed or handled by any corresponding application of the device. Rejecting all of the objects causes all of the current objects in the queue to be deleted. The user is not required to respond to the notification immediately, but can decide what to do about the received objects at a later time. For devices that are partners, incoming object transfers can be accepted without prompting the user.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
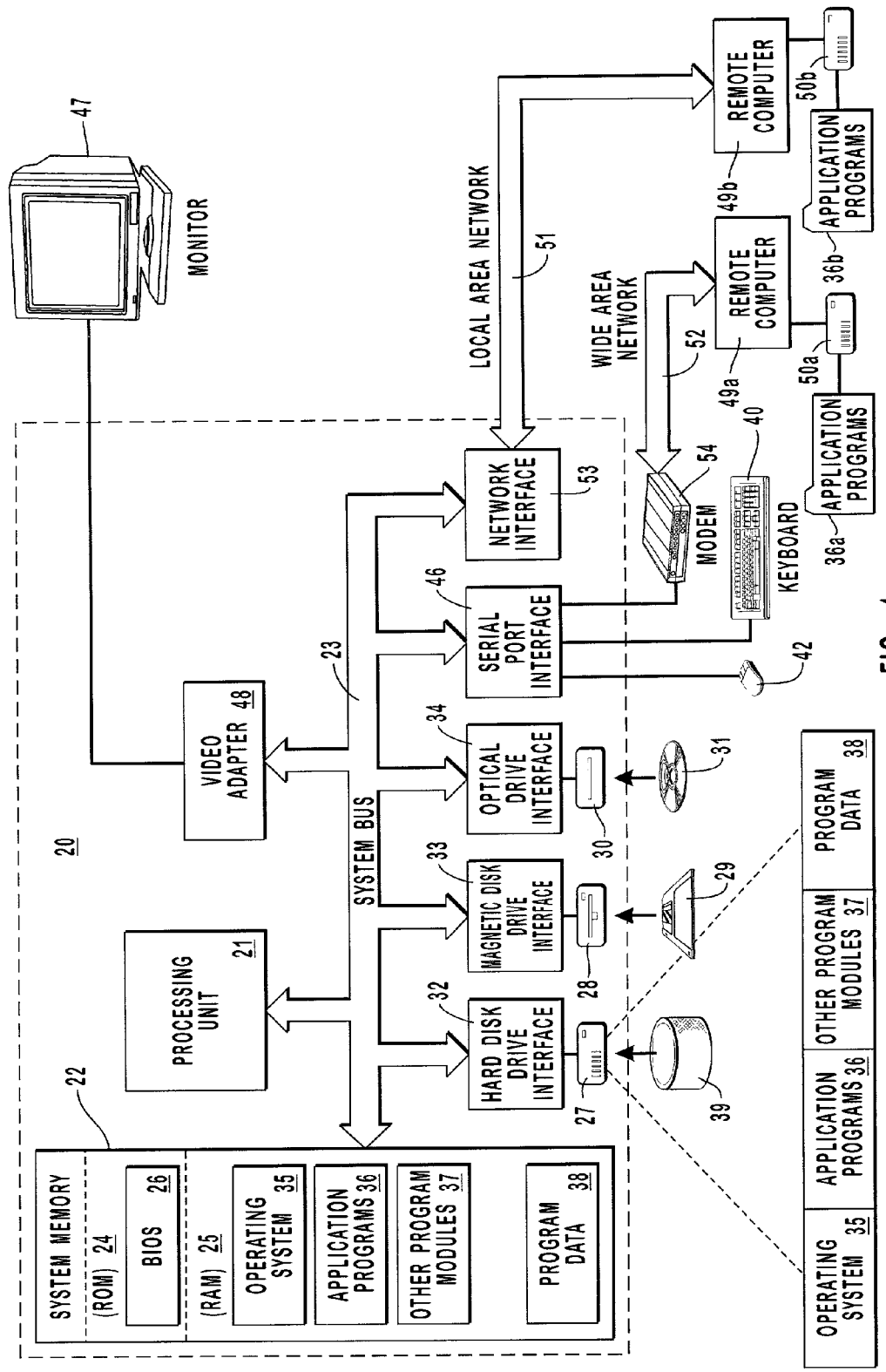
FIG. 1 illustrates an exemplary system that provides a suitable operating environment for the present invention.

The present invention relates to systems and methods for managing asynchronous incoming object transfers or beams to a device. In accordance with the present inventions, many devices will have the capability to receive and transfer data over more than one protocol including, but not limited to, infrared, bluetooth, Wi-Fi, 802.11a, 802.11b, and other wireless and/or wired communication or data transmission protocols and networks. When a device has this ability, it is possible that the device will receive multiple asynchronous object transfers from multiple devices.

The present invention provides the advantage of being able to receive asynchronously transferred objects while reducing any security risk that may be posed to the device or to data/applications/operating systems stored on the device. This is essentially accomplished by implementing a temporary storage for the incoming objects and having the user determine whether the received objects should be accepted or rejected. By providing the user with the ability to receive and/or reject each received object, an object cannot be stored or activated on the user's device unknowingly. This creates a layer of security such that the received objects do not have the opportunity act on other data of the device until the user makes a decision about the received objects. Objects that are compatible with particular applications are not provided to those applications until the objects are accepted by the user.

The present invention thus extends to both methods and systems for managing incoming or asynchronous object transfers. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, personal digital assistants (PDAs), multiprocessor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The System bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in officewide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The present invention is described in terms of a device such as a PDA, but it is understood that the systems and methods described herein can be applied on other devices such as cellular telephones, laptop computers, pagers, and other devices that can receive incoming object transfers over wireless and/or wired systems, networks and protocols. As used herein, an "incoming object transfer," "asynchronous object transfer," and "object transfer" are interchangeable and refer to objects or files that are being sent or beamed from one or more devices to a receiving device. Exemplary objects or files include, but are not limited to, address objects, calendar objects, contact objects, and other types of objects and files, including executables and the like or any combination thereof.

Figure 2:
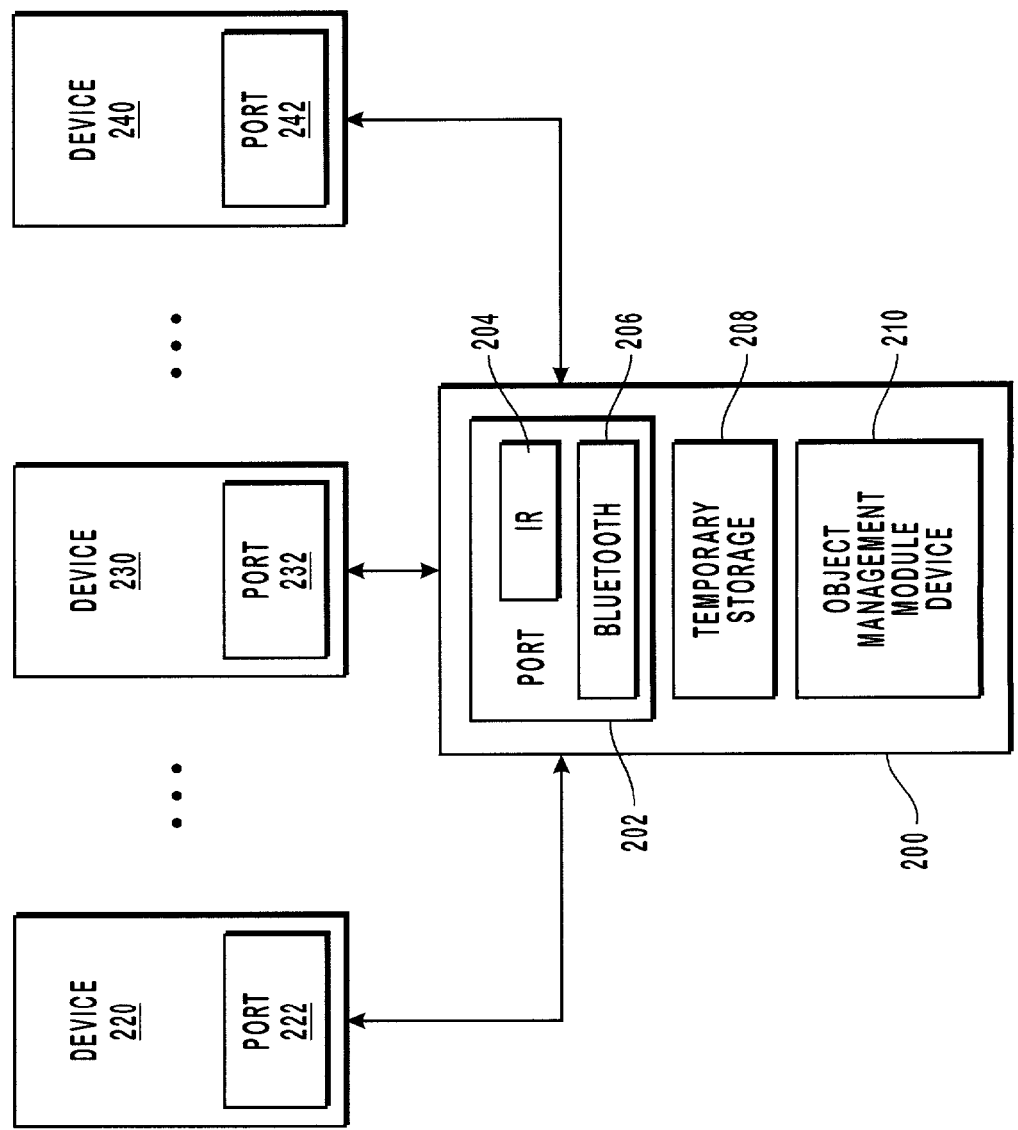
FIG. 2 is a block diagram illustrating a device capable of receiving objects from multiple devices over multiple communication or data transmission protocols.

FIG. 2 is a block diagram that illustrates an exemplary environment in which the systems and methods of the present invention may be implemented. FIG. 2 illustrates a device 200 that is representative of multiple devices as previously mentioned. The device 200 includes a port 202 over which data such as objects and files are received from other devices and over which data is transferred to other devices. The port 202 is representative of ports including, but not limited to, a IR port 204 and a Bluetooth port 206. With respect to incoming object transfers, the objects are stored in a temporary storage 208. The object management 210, processes the objects as will be described below in more detail.

The devices 220, 230, and 240 represent devices that may send an object to the device 200 using their respective ports 222, 232, and 242. These devices are not required to be the same type of device as the receiving device 200. Thus the device 220 may be a PDA, the device 230 may be a cellular telephone, and the device 240 may be a laptop computeer. The ports on the devices 220, 230, and 240 can be IR ports, Bluetooth ports or other ports complying with different protocols as previously described. In general, the devices 220, 230, and 240 communicate with the device 200 over a wireless network or wireless communication protocol. The device 200 is able to receive an object transfer from one or more of these devices 220, 230, and 240.

For example, the device 230 may communicate, beam or transfer an object over an IR port, which implies that the device 230 and the device 200 have a direct line of sight between the IR port of the device 230 and the IR port 204 of the device 200. As the same time, the device 220 may communicate, beam or transfer an object to the device 200 using a bluetooth port. Because bluetooth allows for more than one object to be transferred at a time, it is also possible that the device 240 is attempting to send or beam an object to the device 200. Thus, the device 200 is receiving asynchronous object transfers from multiple devices over multiple protocols and the present invention is directed to managing these asynchronous object transfers regardless of the protocol used to transfer and receive the object at the device 200.

Figure 3:
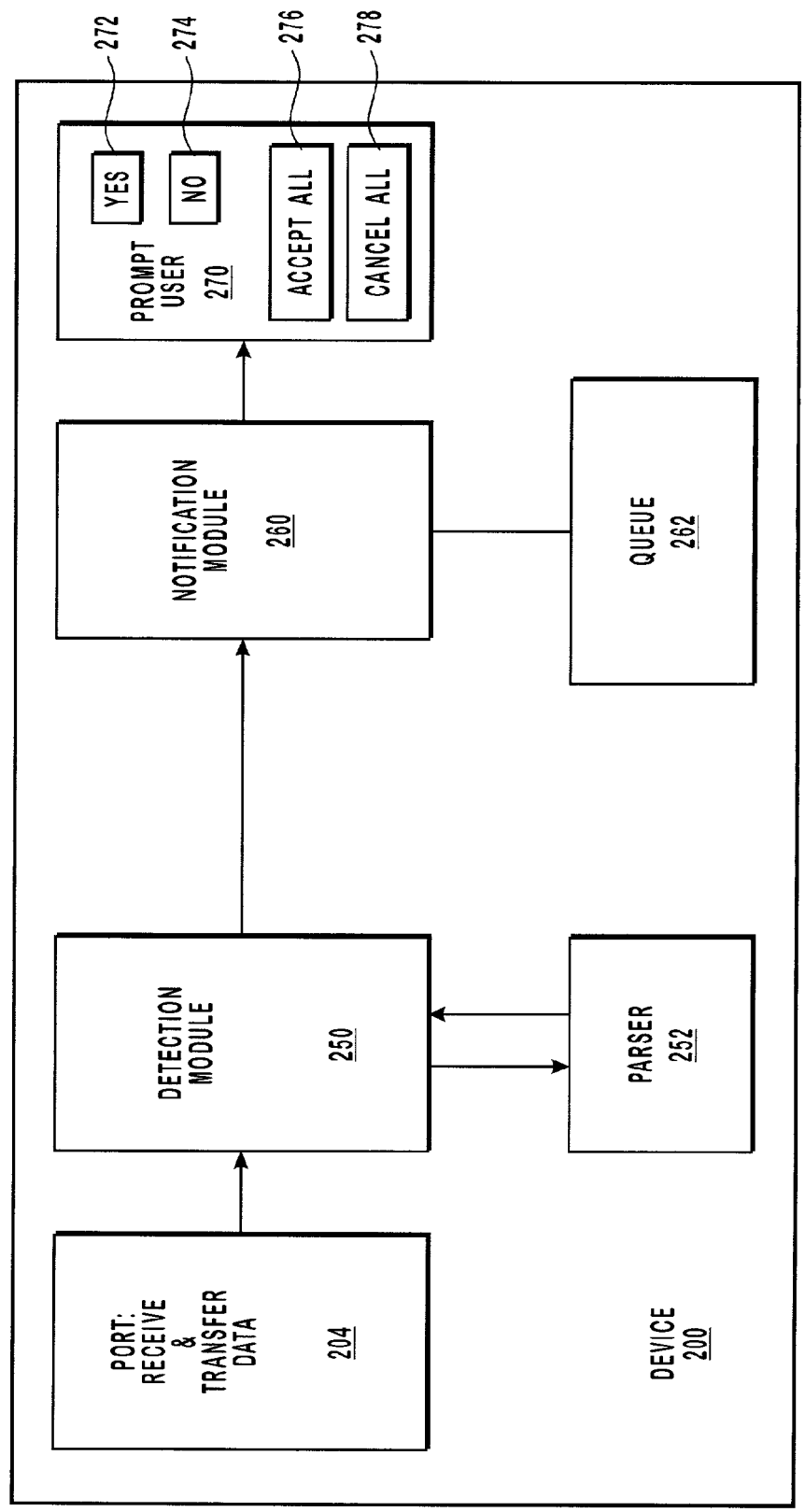
FIG. 3 is a block diagram illustrating how a device processes each of the objects that are received from other devices over various communication or data transmission protocols.

FIG. 3 is a block diagram that more fully describes object management from the perspective of a device such as a PDA. The device 200, as shown in FIG. 3, has a port 204 over which incoming object transfers are received. As a general rule, the device 200 will only accept one incoming object transfer at a time. If more than one device is attempting to send an object, only the first device will be serviced. Additional incoming object transfers will be ignored or denied until the current incoming object transfer is completed. Alternatively, the device 200 may be configured to receive multiple objects concurrently in accordance with the particular protocol used to transfer the object.

By focusing on a single incoming object transfer at a time, however, the device 200 is provided with additional security. Typically, the device 200 is always listening for incoming object transfers or is configured to always receive incoming object transfers. In some instances, however, the device 200 can be configured to not listen for incoming object transfers. In other words, the ability to receive objects may be disabled.

When an incoming object is received via the port 204, the detection module 250 detects the object and the received object is parsed by the parser 252. By parsing the received object, the device 200 can determine, for example, what type of object has been received, who sent the object, and other data. After the object is parsed, the detection module provides the parsed object to the notification module 250.

The notification module 250 generates a notification to the user and stores the object in a temporary storage such as a queue 262, although other structures may be used to temporarily store the received objects. After the notification is generated, the user is prompted (270) that an object has been received. In the prompt, the user can accept the object by selecting a yes option 272, in which case the object is persistently stored in the device. In other instances, the object is also processed by an appropriate application or by an application that processes objects of a given type. For example, an accepted calendar object is processed by the calendar application and is stored on the calendar, an accepted contact object is processed by the contact application and stored as a contact, and so forth.

As previously stated, some information is usually obtained from object as it is parsed. Thus, the user may receive this information in the prompt. For example, if a contact object is received, the user may be prompted with text that incorporates information associated with the object such as "Do you wish to add 'FIRST-NAME-FIELD' to your contact list?" If the object is unidentified or if the object type is unknown, the user may be prompted with text such as "Do you want to accept the file "filename.file-extension"?" If the user decides to cancel or not accept the object, the user can select a no option 274, in which case the object is simply deleted from the queue 262 without having been processed by any other application of the device 200. The objects are usually stored in the queue 262 until they are accepted or rejected by the user.

The prompt (270) provided to the user may also indicate how many objects are currently in the queue 262. The user may select an accept all option 276, which causes all of the objects to be processed by the relevant applications and incorporated into the data of the device and persistently stored. Alternatively, the user may select a cancel all option 278, which will cause all of the objects currently stored in the queue 262 to be deleted or discarded.

When a user is initially notified of a received object, the notification or prompt is global and can be received or accessed from anywhere on the device. However, the user is not required to immediately accept or reject the objects that have been received. They can be stored in the queue until the user is ready to accept and/or reject the objects stored in the queue.

Figure 4:
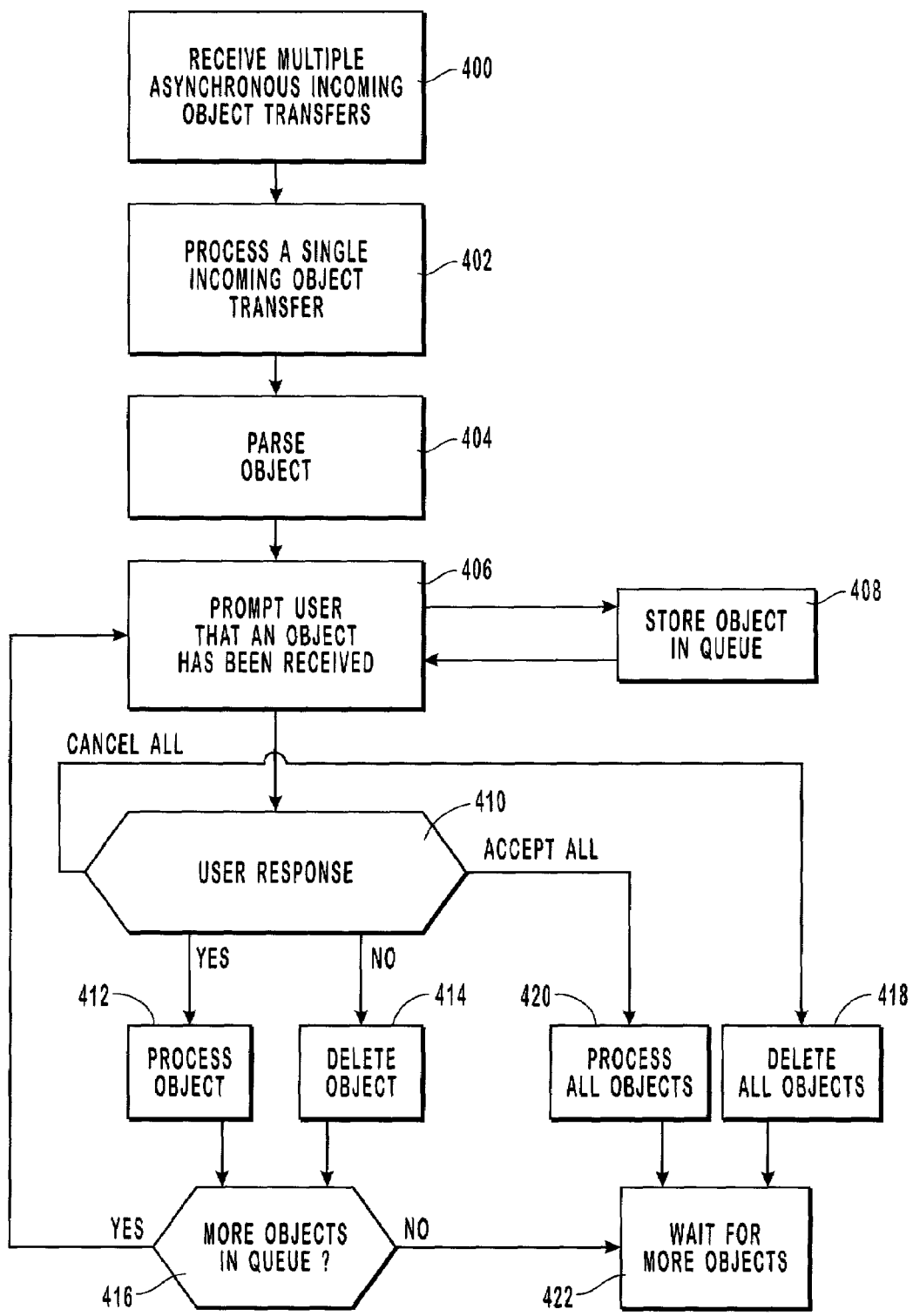
FIG. 4 is a flow diagram of an exemplary method for processing objects received at a device over different protocols.

FIG. 4 is a flow diagram that illustrates an example of how asynchronous object transfers are processed by a device. At 400, multiple asynchronous object transfers are received at the device. However, only one incoming object transfer is processed at a time (402). Other incoming object transfers are either ignored until the current object transfer is complete or the other object transfers are rejected by the device. In another embodiment, more than one incoming object transfer is accepted. Each received object, however, is handled in similar manner thereafter by the device.

Next, each received object is parsed (402) and certain information may be extracted to obtain more details about the object without processing the object with its associated application. In some instances, the extracted information is included in the object transfer and is not part of the actual object. As used herein, the identifying information or extracted information refers to data obtained from the object transfer and may or may not be part of the actual object, but may have been included in the object transfer.

For example, the sender of the object is determined if possible and the object's type is also determined. Other properties, such as object size, object name, and the like can also be determined and made known to the user. Using the extracted information, the user is prompted (406) that an object has been received from "sender" and that it is a "type" of object. Other details about the received object may also be presented to the user and the present invention is not limited to identifying the sender and/or the type of the object. The information about the object presented to the user in the prompt is arbitrary and may be configured by the user in some instances. In any event, the received object is stored in a queue (408) or other temporary storage until the user determines how to handle (accept or reject, for example) the received object.

If the user immediately responds to the prompt, then the object is processed or handled immediately and it may not be necessary to store the object in the queue. If the user does not immediately respond to the prompt, then the received object(s) are stored in the queue and they remain in the queue until they are handled or processed by the user at a later time. In one example where the user does not immediately respond to the prompt and the object is stored in the queue (408), the user will again be prompted for the objects stored in the queue after a certain amount of time or according to a pre-determined schedule. In this manner, the user is reminded that the device has received objects and that the user needs to make a decision regarding those objects.

There is no requirement on the user that immediate action be taken with respect to the object(s) in the queue. If the queue becomes excessively large, then the user can be notified of this fact or other actions may be taken, such as refusing to receive additional objects or overwriting some of the objects that currently exist in the queue. When the user decides to process or handle the objects, then the user is prompted for each object in the queue. Thus, prompting a user with respect to one or more objects refers to prompting the user when an object is initially received and/or prompting the user for the objects that were not processed when they were initially received at the device and are currently stored in the queue.

When the user responds to the prompt or provides a user response (410), either when prompted or at a later time, various options are presented to the user. The user can accept the object by selecting YES and the object is processed (412) by the appropriate application. The user can reject or cancel the object by selecting NO and the object is deleted from the queue (414). In both of these instances, the device 200 will check to see if additional objects are in the queue (416). If other objects are in the queue, then the user is prompted with regard to the next object in the queue as described above. Otherwise, the user is finished and the device simply waits for new objects to be received (422).

The user also has the option of selecting the ACCEPT ALL option with respect to the objects in the queue, in which case all of the objects in the queue are processed (420) by the appropriate applications. Similarly, the user can select the CANCEL ALL option with respect to the objects in the queue, in which case all of the objects are deleted (418) from the queue or other temporary storage. If the user accepts or rejects all of the objects, the device again waits for additional new objects to be received (422). If no action is received from the user at user response (410), then the objects remain in the queue. In effect, the user is postponing his or her response to the prompt by not responding to the initial prompt.

Consider the following example where a user attends a meeting with five other individuals that also have a device. At the meeting, each of the individuals decides to send their contact information to the other devices. The contact information of each individual is transferred as a contact object. Thus, each device will receive five object transfers that contain contact data. These objects, as previously described, are parsed and stored in a temporary queue or other temporary storage of each device.

Each user is then prompted about the first object. In the prompt, the user will be informed that there are 5 objects that have been received. Because the user knows that he or she just received contact data from 5 people, the user will likely select the accept all option, in which case all 5 objects are processed by the contact application of the device. If the user is informed in the prompt that 6 objects have been received, then the user will likely accept each contact object one at a time in order to perhaps receive more detailed information about the sixth object. This provides the user with the ability to either accept or reject the sixth object.

Another aspect of the present invention refers to devices that have an established relationship or are partners. When two devices are partners, then incoming object transfers from partners are automatically accepted by the device and the user is not usually prompted about these objects. However, the user may be notified that an object was received from a partner. Often, a user can establish a partnership by entering a pin number on both devices. When an object is received, the pin number included in the incoming object transfer is compared against the pin number of the device and the object transfer is automatically processed only if the pin numbers match.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a plurality of devices that are logically interconnectable over multiple wireless networks that each have a different communication protocol, wherein one or more devices transfer objects to a receiving device over the wireless networks, a method for managing incoming object transfers received from the one or more devices without regard to the wireless network used by each of the one or more devices, the method comprising:
   a step for receiving, at a receiving device, one or more object transfers from one or more devices, wherein an object is received at the receiving device in each of the one or more object transfers corresponding to one or more applications;
   a step for generating a corresponding notification regarding the receipt of each object;
   a step for storing each object in a temporary storage of the receiving device;
   a step for prompting a user at the receiving device with the corresponding notification, that each object has been received and also providing the user at the receiving device selectable options to either accept or reject each corresponding object;
   a step for persistently storing, at the receiving device, each object that is accepted, and such that the objects received at the receiving device are only stored in persistent memory and subsequently processed by the receiving device upon being accepted by the user at the receiving device in response to the prompting; and
   a step for deleting, at the receiving device, each object that is rejected by the user at the receiving device, and in such a manner that the deleted objects are deleted without being stored in persistent memory of the receiving device and without being processed by the corresponding one or more applications at the receiving device.

2. A method as defined in claim 1, wherein the step for prompting the user to accept of decline each object further comprises a step for prompting the user to accept or reject all objects currently stored in the temporary storage.

3. A method as defined in claim 2, wherein the step for prompting the user to accept or reject all objects currently stored in the temporary storage further comprises one of:
   persistently storing all of the objects on the device that are currently stored in the temporary storage; and
   deleting all of the objects from the temporary storage.

4. A method as defined in claim 1, wherein the step for persistently storing each object that is accepted further comprises a step for processing each object with an associated application.

5. A method as defined in claim 1, wherein the temporary storage is a queue.

6. A method as defined in claim 1, wherein the step for receiving one or more object transfers from one or more devices further comprises a step for parsing each object received over the one or more object transfers.

7. A method as defined in claim 6, wherein the step for parsing further comprises and act of extracting identifying information from each object, wherein the identifying information is presented to the user during the step for prompting the user to accept or decline each object, wherein the identifying information comprises a sender identity and an object type.

8. In a system including a plurality of devices that are logically interconnectable over multiple wireless networks that each have a different communication protocol, wherein one or more devices transfer objects to a receiving device over the wireless networks, a computer program product for implementing a method for managing incoming object transfers from the one or more devices without regard to the wireless network used by each of the one or more devices, the computer program product comprising:
   a computer readable medium having computer executable instructions for performing the method recited in claim 1.

9. A computer program product as defined in claim 8, wherein the step for prompting the user to accept of decline each object further comprises a step for prompting the user to accept or reject all objects currently stored in the temporary storage.

10. A computer program product as defined in claim 9, wherein the step for prompting the user to accept or reject all objects currently stored in the temporary storage further comprises one of:
   persistently storing all of the objects on the device that are currently stored in the temporary storage; and
   deleting all of the objects from the temporary storage.

11. A computer program product as defined in claim 8, wherein the step for persistently storing each object that is accepted further comprises a step for processing each object with an associated application.

12. A computer program product as defined in claim 8, wherein the temporary storage is a queue.

13. A computer program product as defined in claim 8, wherein the step for receiving one or more object transfers from one or more devices further comprises a step for parsing each object received over the one or more object transfers.

14. A computer program product as defined in claim 13, wherein the step for parsing further comprises and act of extracting identifying information from each object, wherein the identifying information is presented to the user during the step for prompting the user to accept or decline each object, wherein the identifying information comprises a sender identity and an object type.

15. A method as recited in claim 1, wherein the notification is generated with information from the object transfer, rather than the object, that specifies a type of the corresponding object and a sender of the object.

16. A method as recited in claim 1, wherein the step for prompting includes prompting the user multiple times based on at least one of a certain amount of time and a predetermined schedule.

17. A method as recited in claim 1, wherein the notification also indicates to the user a total number of objects that have been received and that are stored in the temporary storage of the receiving device.

18. In a system including multiple sending devices that are able to send an object to a receiving device over one or more wireless networks using different communication protocols and wherein the receiving device is unaware of an identity of at least some of the sending devices, a method for the receiving device to determine which objects received from the sending devices are accepted and incorporated into the receiving device and which objects received from the sending devices are rejected, the method comprising:
   receiving each object transfer at the receiving device;
   after each object is received, parsing each object at the receiving device to determine identifying information, if available, about the object, wherein the identifying information comprises a sender identity and an object type;
   generating a corresponding notification regarding the receipt of each object;
   storing each parsed object in a queue;
   prompting the user, at the receiving device, to either accept or reject each object in the queue, with the corresponding notification and selectable options, one at a time until no objects remain in the queue;
   processing each accepted object, at the receiving device, with an associated application of the receiving device to incorporate each accepted object into the receiving device, wherein each accepted object is only processed with the associated application by the receiving device upon first being accepted by the user, at the receiving device, in response to the prompting; and
   deleting each rejected object from the queue upon being rejected, at the receiving device, and in such a manner that each rejected object is deleted without being processed with the associated application at the receiving device.

19. A method as defined in claim 18, wherein receiving each object transfer at the receiving device further comprises a step for processing only one object transfer at a time, wherein other object transfers are not processed by the device until a current object transfer is complete.

20. A method as defined in claim 18, wherein receiving each object transfer at the receiving device comprises storing each object is a temporary storage.

21. A method as defined in claim 18, wherein prompting the user to either accept or reject each object in the queue one at a time until no objects remain in the queue comprises prompting the user to either accept or reject all objects in the queue at the same time such that the user is not prompted for each object in the queue.

22. A method as defined in claim 21, further comprising one of:
   processing all objects in the queue if the user accepts all objects; and
   deleting all objects in the queue if the user rejects all object.

23. A method as defined in claim 18, wherein the associated application is one of a contact application, an address application, and a calendar application, and the object is one of a contact object, an address object, and a calendar object, wherein processing each accepted object with an associated application of the device further comprises one or more of:
   processing contact objects with the contact application on the device;
   processing address objects with the address application on the device; and
   processing calendar objects with the calendar application on the device.

24. A method as defined in claim 18, wherein prompting the user to either accept or reject each object in the queue one at a time until no objects remain in the queue further comprises providing the identifying information to the user in the prompt.

25. A method as defined in claim 18, further comprising an act of the device partnering with another device, wherein objects received from a partner device are accepted without prompting the user to accept or reject the object received from the partner device.

26. A method as defined in claim 18, further comprises an act of continually listening to receive new objects from other devices.

27. In a system including multiple sending devices that are able to send an object to a receiving device over one or more wireless networks using different communication protocols and wherein the receiving device is unaware of an identity of at least some of the sending devices, a computer program product for implementing a method for the receiving device to determine which objects received from the sending devices are accepted and incorporated into the receiving device and which objects received from the sending devices are rejected, the method comprising:
   a computer readable medium having computer executable instructions for performing the method recited in claim 18.

28. A computer program product as defined in claim 27, wherein receiving each object transfer at the receiving device further comprises a step for processing only one object transfer at a time, wherein other object transfers are not processed by the device until a current object transfer is complete.

29. A computer program product as defined in claim 27, wherein receiving each object transfer at the receiving device comprises storing each object is a temporary storage.

30. A computer program product as defined in claim 27, wherein prompting the user to either accept or reject each object in the queue one at a time until no objects remain in the queue comprises prompting the user to either accept or reject all objects in the queue at the same time such that the user is not prompted for each object in the queue.

31. A computer program product as defined in claim 30, further comprising one of:
processing all objects in the queue if the user accepts all objects; and
deleting all objects in the queue if the user rejects all objects.

32. A computer program product as defined in claim 27, wherein the associated application is one of a contact application, an address application, and a calendar application, and the object is one of a contact object, an address object, and a calendar object, wherein processing each accepted object with an associated application of the device further comprises one or more of:
processing contact objects with the contact application on the device;
processing address objects with the address application on the device; and
processing calendar objects with the calendar application on the device.

33. A computer program product as defined in claim 27, wherein prompting the user to either accept or reject each object in the queue one at a time until no objects remain in the queue further comprises providing the identifying information to the user in the prompt.

34. A computer program product as defined in claim 27, further comprising an act of the device partnering with another device, wherein objects received from a partner device are accepted without prompting the user to accept or reject the object received from the partner device.

35. A computer program product as defined in claim 27, further comprises an act of continually listening to receive new objects from other devices.

36. In a device that has one or more ports for receiving and transferring objects over one or more wireless networks that have different communication protocols, a method for managing objects received from other devices without regard to which network the objects were transferred over and without regard to the different communication protocols of the networks, the method comprising:

receiving one object at a time over each of the one or more ports of a receiving device, wherein other object transfers are ignored or are postponed until a current object transfer is completed at each port;
detecting each received object at the receiving device, wherein each received object is parsed;
generating a corresponding notification regarding the receipt of each object;
after each object has been parsed, storing each object in a temporary queue;
notifying a user of the receiving device with the notification that an object has been received via a global prompt, which is global because it is enabled to be received and accessed from anywhere on the receiving device, wherein the global prompt allows the user of the receiving device to accept a current object corresponding to the notification from anywhere on the receiving device, reject the current object, accept all objects currently in the temporary queue, or reject all objects in the temporary queue;
persistently storing each object accepted by the user of the receiving device only upon first being accepted; and
deleting each object rejected by the user of the receiving device from the temporary queue and in such a manner that the deleted objects are deleted without being stored in persistent memory of the receiving device and without being processed by corresponding applications at the receiving device.

37. A method as defined in claim 36, wherein detecting each received object at the device further comprises identifying a sender of each object and identifying a type of each object.

38. A method as defined in claim 37, wherein persistently storing each accepted object at the device further comprises processing each accepted object with an application associated with the type of each accepted object.

* * * * *

UNITED STATES PATENT AND TRADEMARK OFFICE
CERTIFICATE OF CORRECTION

PATENT NO. : 6,993,552 B2
APPLICATION NO. : 09/964318
DATED : January 31, 2006
INVENTOR(S) : Andrew W. Jacobs et al.

It is certified that error appears in the above-identified patent and that said Letters Patent is hereby corrected as shown below:

Title Pg, Item (56), under "Foreign Patent Documents", in column 1, line 1, after "8/1999" insert -- H04M 1/57 --.

In column 4, line 46, after "The" delete "System" and insert -- system --, therefor.

In column 5, line(s) 4-5, delete "computer readable" and insert -- computer-readable --, therefor.

In column 6, line 22, delete "computeer" and insert -- computer --, therefor.

In column 10, line 12, in Claim 2, after "accept" delete "of" and insert -- or --, therefor.

In column 10, line 47, in Claim 8, delete "computer executable" and insert -- computer-executable --, therefor.

In column 10, line 51, in Claim 9, after "accept" delete "of" and insert -- or --, therefor.

In column 11, line(s) 19-20, in Claim 16, delete "pro-determined" and insert -- pre-determined --, therefor.

In column 12, line 12, in Claim 22, delete "object" and insert -- objects --, therefor.

In column 12, line 49, in Claim 27, delete "computer executable" and insert -- computer-executable --, therefor.

Signed and Sealed this

Twenty-eighth Day of July, 2009

JOHN DOLL
*Acting Director of the United States Patent and Trademark Office*